United States Patent Office 2,734,000
Patented Feb. 7, 1956

2,734,000

METHOD OF REMOVAL OF THERMO-PLASTIC RESINS FROM CONDUCTORS AND TINNING THEREOF

Leopold Pessel, Whitemarsh, Pa., assignor to Radio Corporation of America, a corporation of Delaware No Drawing. Application February 29, 1952, Serial No. 274,303

8 Claims. (Cl. 117—51)

This invention relates to an improved process of stripping insulation from wires, and, more particularly, to a process in which the coated wire is first dipped in a stripping agent and then into molten solder.

Electrical conductors which are used in small transformer coils, loudspeaker voice coils, induction coils, and the like, usually consist of relatively small diameter copper wire coated with a thin film of an insulating varnish. In making electrical connections with this type of conductor, which is known generally as "magnet wire," the insulating coating must first be removed before a soldered junction can be made.

One of the ways of removing insulation from the ends of small diameter "magnet wire" is to insert them between two rotating wheels surfaced with an abrasive material. The abrasive mechanically strips the insulation from the wire. Although this method is satisfactory for some purposes and is efficient when the larger gauges of "magnet wire" are being used, the mechanical stripping machines often break off the ends of the wires if fine gauge wire is being used. Because of the difficulty with breakage, in the case of smallest diameter wire, it has appeared to be advantageous to find some method of stripping insulation which does not impose a mechanical strain on the wire.

In the past, fine "magnet wire" has been coated either with oleoresinous enamels or thermosetting synthetic resins of various types. After baking, these coatings are non-fusible but will char or burn when heated to a sufficiently high temperature. Thermal methods have been devised for the stripping of such coatings. These have usually involved immersing the wire in a high temperature metal or salt bath or the application of a high temperature flame directly to the part to be stripped. However, because of the high temperatures involved, wires thus treated often suffer from excessive oxidation, annealing, embrittlement, or, in the case of use of a high temperature solder bath, penetration of solder ingredients into the metal of the wire, with dissolution of the latter.

Because of the difficulties with high temperature methods of insulation removal, manufacturers have, more recently, used insulating varnishes composed of resinous materials which are completely fusible at relatively low temperatures. The objective has been to have a coating which would have the required insulating value and toughness and, at the same time, one capable of flowing away from the wire leaving a bare and clean surface ready to be soldered, upon local application of heat. These coatings are known as "fusion stripping" type coatings and usually comprise mainly superpolyamides, known commercially as "nylon," and may also include other well known thermoplastic resins such as polystyrene, methacrylate and ethacrylate polymers, copolymers of vinyl chloride-vinyl acetate, and cellulose esters such as cellulose acetate or butyrate.

In practice, it has not been found possible to remove the "fusion stripping" type of coating rapidly enough and cleanly enough for most commercial production by merely immersing the coated wire in a solder pot held at 600°–700° F. In order to accelerate the removal, a pre-dip in rosin has been tried. However, even with using a pre-dip in rosin before immersing the coated wire in a pot of molten solder, it has been found in practice that the insulation often is not completely removed, especially if the wire to be soldered is wound around terminals, such as those made of tinned or cadmium-plated brass, for example. If an attempt is made to shorten the time of immersion in the solder pot in order to speed up an assembly operation, the insulation residues cause many poor solder joints to be formed which fail when tested.

Although the incomplete removal of insulation residues on "fusion-stripping" wire can usually be corrected by increasing the length of time of immersion of the wire in the solder pot, this practice usually leads to increased production costs.

The present invention is an improved process of stripping the insulation coating from thermoplastic resin-coated type wire, particularly "magnet wire," in which the removal of the insulation is greatly accelerated. The thermoplastic resin must be of the type which becomes completely liquid when heated and not merely softened. In general, the process comprises dipping the portion of the coated wire to be soldered in a composition which preferably includes at least 20% by weight of benzoic acid or any one of a number of benzoic acid derivatives which will be more specifically identified later, and then dipping in a bath of molten solder of any conventional composition.

One object of the present invention is to provide an improved method of stripping the insulation from "magnet wire" coated with thermoplastic resinous materials.

Another object of the invention is to provide an improved method of removing "fusion stripping" type coatings from "magnet wire."

Another object of the invention is to provide an improved method of stripping thin coatings of thermoplastic resins from metallic bases.

Another object of the invention is to provide an improved method of removing thermoplastic resin coatings from copper or aluminum wire.

Another object of the invention is to provide a method of accelerating the rate of removal of thermoplastic resinous coating materials from metallic electric conductors when the process includes dipping the coated wire in a bath of molten solder.

Another object of the invention is to provide an improved method of stripping thin coatings of thermoplastic resinous materials including a superpolyamide from copper "magnet wire."

Still another object of the invention is to provide improved compositions for accelerating the removal of thermoplastic synthetic resins from metallic electric conductors.

These and other objects will be more apparent and the invention will be more readily understood from the description which follows.

In carrying out the method of the present invention, it is necessary to simply dip the end of the coated wire which is to be soldered in certain compositions later to be identified, and then to immerse the treated wire for a few seconds in a pot of molten solder. The solder may also be applied in other conventional ways such as by contacting the treated wire with a piece of solder and hot solderingiron. The compositions affect the coatings so that when the wires are contacted to molten solder, the coatings are removed and simultaneously the wires are tinned.

In order to determine the scope of the invention and to test the speed and efficacy of coating removal, a large number of tests were made on wires coated with various thermoplastic resins of the type which are completely fluid when melted, and using various benzoic acid derivatives as the accelerating agents. One series of tests was made by cutting 2 inch lengths from a coil of No. 32 gauge copper wire thinly coated with superpolyamide resin. The wire had been wound over a coil form and had been subjected to wax impregnation and dipping in a cement comprising a copolymer of vinyl chloride-vinyl acetate. Cut lengths of the wire were first dipped in a bath of 60% tin-40% lead solder maintained at 600° F. without pre-treatment with an accelerating agent. No stripping or tinning of the wire could be accomplished even with extended periods of immersion in the solder pot; i. e., periods of 20 seconds or more duration. Negative results were also obtained when the wire was first dipped in an alcoholic rosin solution before dipping in the solder.

In contrast to the above described negative results, cut lengths of the same wire were first dipped in powdered benzoic acid or its derivatives, as listed below, and then in the same molten solder bath as above, for only four seconds. In each case, the insulation coating was completely and cleanly removed and the wire was properly tinned.

*Examples of thermoplastic resin stripping accelerating agents*

Benzoic acid
Anisic acid (para-methoxy benzoic acid)
Para-ethoxy benzoic acid
Methylene disalicylic acid
Beta resorcylic acid
Salicylic acid
Acetyl salicylic acid
Para-amino salicylic acid
O-chlorobenzoic acid (also meta- and para-)
Ortho-, meta, and para amino benzoic acid
2,4-dichlorobenzoic acid
4 chloro-3 nitro-benzoic acid
2,4-dimethoxy benzoic acid
Para-amoxy benzoic acid
Meta (para-tertiary amylphenoxy) benzoic acid
Ortho-benzoyl benzoic acid Although all of the different types of benzoic acid derivatives which were tried were found to have an accelerating effect on the coating removal in the solder bath, certain types are preferred. Among these are the alkoxy benzoic acids. In addition to those in this group listed above, others found effective are: 3,4,dimethoxy benzoic acid, o-methoxy benzoic acid, o-ethoxy benzoic acid, m-methoxybenzoic acid, 2,4,5,-trimethoxybenzoic acid, and 3,4,5,trimethoxybenzoic acid. In general, all of the methoxy- and ethoxy-benzoic acids have been found suitable.

The action of the accelerator is not entirely understood but is believed to be more physical than chemical in nature. It is believed that the —COOH group of the benzoic acid or benzoic acid derivatives exercises a selective wetting effect on the metal of the wire and replaces the molten resin so that it floats free of the wire.

In order to determine whether or not other organic acids exerted a similar effect, many other types were tried. Most of these produced results which were either very poor or entirely negative. A few examples of those organic acids found to exert little or no beneficial accelerating effect were oxalic, sulfanilic, sorbic, aconitic, gluconic, acetic, crotonic, stearic, oleic, iso-cresylic, and adipic. In addition, none of the strong mineral acids had any appreciable accelerating effect.

Although in most cases it is easier and simpler to apply the accelerator by dipping the coated wire in the powdered material, it may also be applied in solution or dispersion form. Solvents such as ethyl or methyl alcohol, toluol, petroleum naphtha, etc., did no harm by their presence.

Another way to apply the accelerating material is to mix it with one or more of the usual water-insoluble fluxing materials, such as rosin, burgundy pitch, stearic acid, Vinsol resin, gum sandarac, etc. The combination of the benzoic acid derivative accelerator and the flux gives better results in the process than the accelerator alone, if the wires are not perfectly clean. If the surface being stripped of coating material is perfectly clean, the presence of the flux is still beneficial since it tends to counteract any tendency of the acidic materials to leave a corrosive residue. The flux, itself, has no accelerating effect. Of this composition, the accelerator may comprise about 20% to about 90% by weight and, preferably, is about 50% by weight.

Examples of suitable compositions of the dry powder type comprising accelerator and flux are:

| | Percent by weight |
|---|---|
| Benzoic acid | 20 |
| Rosin | 80 |
| Anisic acid | 50 |
| Rosin | 50 |
| 2,4-dichlorobenzoic acid | 85 |
| Burgundy pitch | 15 |
| O-benzoyl benzoic acid | 85 |
| Powdered stearic acid | 15 |
| M-(p-tertiary amylphenoxy) benzoic acid | 90 |
| Powdered Vinsol resin | 10 |

Still another way to carry out the method of the present invention is to combine the resin stripping accelerating agent with relatively inert viscous fluids in which the accelerator can be suspended to form a grease. The coated wire to be stripped can then be dipped in the grease momentarily before the final dip in the solder pot. This method is advantageous because the coated wire more readily picks up the accelerating material when it is in the form of a grease than when it is in dry powder form. Some examples of suitable compositions for use in this form of the invention are given below.

| | Percent by weight |
|---|---|
| Anisic acid | 30 |
| Silicone grease (consisting of viscous fluid silicones with finely divided silica in suspension) | 70 |

The ingredients are ground together to form a grease-like paste. The paste may be thinned to any desired consistency with any organic liquid having no solvent effect on the resin to be stripped or the accelerating agent. The thinner should also have a relatively high boiling point. Examples of suitable thinners are toluol, decanol, and tetra-amyl benzene.

| | Percent by weight |
|---|---|
| O-benzoyl benzoic acid | 70 |
| Polybutene (polymerized to the state of a viscous liquid) | 30 |
| O-benzoyl benzoic acid | 50 |
| Powdered burgundy pitch | 10 |
| Polybutene | 40 |
| Anisic acid | 35 |
| Powdered rosin | 35 |
| Petroleum type grease, such as combination of petrolatum and lithium stearate | 30 |

Any of the compositions in the above group may be prepared by grinding the ingredients together to form a paste and then thinning to desired consistency.

Any of the usual solder compositions may be used in the process. For example, solders may be used having the composition 5% tin—95% lead, 60% tin—40% lead, 35% tin—65% lead, 5% silver—95% lead, and 60% tin—40% zinc. These are only a few examples of hundreds of compositions.

The temperatures used can be any required to maintain the solder in a molten state. Usually, this is between about 500° and about 700° F. Generally speaking, if the temperature of the solder bath is raised, the time of immersion is shortened and vice-versa. Usually, the length of immersion time required is from 2 to 5 seconds, depending upon wire size and type of coating. This time is from about ⅓ to ⅕ that required if the accelerator is not used.

Although the process is of most practical value from a commercial viewpoint when used to strip superpolyamide coatings from fine copper magnet wire, since the process is chiefly physico-chemical in nature, it is operative with respect to any of the thermoplastic resins which are completely fluid at the elevated temperatures of the solder bath. Some of these are polymethyl methacrylate, polyvinyl chloride, polyvinyl acetate, copolymers of vinyl chloride-vinyl acetate, ethyl cellulose, cellulose acetate, polystyrene, polyethylene, polytetrafluoroethylene, polyvinyl butyral, and cellulose acetate butyrate. It is to be understood that the present process is not applicable to thermosetting type resins nor to those resins which are merely softened when heated.

The insulation can be stripped equally well from copper or aluminum conductors. The process is of most value in stripping fine gauge "magnet wire" but the gauge of the wire is, of course, no limitation on the process. Wire gauges from 26 to 39 have been stripped with equal effectiveness. It is only from a commercial standpoint that more advantage is gained by using the present process with very fine wires than with wires of larger diameter.

It should be further pointed out that the benzoic acid derivatives which are operative in the present invention preferably should have boiling points above about 600° F. although this limitation is not absolutely necessary. 600° F. is the lowest temperature at which solder pots are usually operated in connection with this method. If benzoic acid derivatives having boiling points below the operating temperature of the solder pot are used, they still exert a beneficial stripping action but their effect is lessened because they are driven off more rapidly by the heat of the solder.

Although water soluble derivatives of benzoic acid are operative in the process of the present invention, it is preferred to use water insoluble materials, since these are less likely to leave corrosive residues which may weaken the solder joints with the passage of time. The ethers of benzoic acid and especially the halogenated ether derivatives are especially preferred because of their water insolubility.

I claim as my invention:

1. A method of removing from metallic electric conductors coatings of thermoplastic resins of the type which are completely fluid at elevated temperatures, and simultaneously tinning said conductors comprising treating the coated conductor with an accelerating agent and then applying molten solder to the treated conductor thereby simultaneously to remove said coating and to tin said conductor, said accelerating agent consisting essentially of at least one of the group consisting of: benzoic acid, benzoic acid ethers, methylene disalicylic acid, beta resorcylic acid, salicylic acid, acetyl-salicylic acid, para-amino salicylic acid, o-chlorobenzoic acid, para-chlorobenzoic acid, meta-chlorobenzoic acid, ortho-, meta-, and para-amino benzoic acids, 2,4-dichlorobenzoic acid, 4 chloro-3 nitrobenzoic acid, para-amoxy benzoic acid, meta (para-tertiary amyl-phenoxy) benzoic acid, ortho-benzoyl benzoic acid, methoxy-benzoic acid, and ethoxy-benzoic acid.

2. A method according to claim 1 in which said conductor is copper wire.

3. A method according to claim 1 in which said conductor is fine gauge copper "magnet wire."

4. A method according to claim 1 in which said accelerating agent is an ether of benzoic acid.

5. A method according to claim 4 in which said ether is an alkoxy type.

6. A method according to claim 1 in which the material with which the coated conductor is first treated also includes a fluxing agent.

7. A method according to claim 6 in which said fluxing agent is rosin.

8. A method according to claim 1 in which said accelerating agent is in powder form.

References Cited in the file of this patent

UNITED STATES PATENTS

| | | |
|---|---|---|
| 2,174,538 | Stoesser et al. | Oct. 3, 1939 |
| 2,231,733 | Normington et al. | Feb. 11, 1941 |
| 2,383,147 | Morgan | Aug. 21, 1945 |
| 2,505,627 | Pessel | Apr. 25, 1950 |
| 2,614,962 | Elson (1) | Oct. 21, 1952 |
| 2,614,963 | Elson (2) | Oct. 21, 1952 |